United States Patent [19]
Catallo

[11] Patent Number: 5,868,169
[45] Date of Patent: Feb. 9, 1999

[54] REINFORCED LINING HOSE FOR SOFTLINING PIPE REHABILITATION

[76] Inventor: Giulio Catallo, 5134 Holly Terrace Dr., Houston, Tex. 77045

[21] Appl. No.: 713,981

[22] Filed: Sep. 13, 1996

Related U.S. Application Data

[63] Continuation of Ser. No. 459,279, Jun. 2, 1995, abandoned, which is a continuation of Ser. No. 56,176, May 3, 1993, abandoned.

[51] Int. Cl.$^6$ ....................................................... F16L 9/14
[52] U.S. Cl. ................................ 138/98; 158/97; 158/124
[58] Field of Search ................................. 138/97, 98, 124, 138/125, 126, 127; 264/269, 270; 156/287

[56] References Cited

U.S. PATENT DOCUMENTS

| | | | |
|---|---|---|---|
| 3,996,967 | 12/1976 | Takada | 138/97 |
| 4,681,783 | 7/1987 | Hyodo et al. | 138/98 |
| 4,836,715 | 6/1989 | Wood | 138/98 |
| 4,851,274 | 7/1989 | D'Elia | 428/113 |
| 4,877,665 | 10/1989 | Higuchi et al. | 138/98 |
| 4,907,624 | 3/1990 | Jonasson | 138/125 |
| 4,972,880 | 11/1990 | Strand | 138/98 |
| 4,976,290 | 12/1990 | Gelin et al. | 138/98 |
| 5,030,493 | 7/1991 | Rich | 138/98 |
| 5,077,107 | 12/1991 | Kaneda et al. | 138/98 |
| 5,172,730 | 12/1992 | Driver | 138/98 |
| 5,271,433 | 12/1993 | Schwert et al. | 138/98 |

FOREIGN PATENT DOCUMENTS

| WO03131 | 9/1983 | WIPO | 138/98 |
|---|---|---|---|

OTHER PUBLICATIONS

ASTM C 581–87 entitled "Standard Practice for Determining Chemical Resistance of Thermosetting Resins Used in Glass–Fiber–Reinforced Structures Intended for Liquid Service". Date of Publication: Apr. 1987.

*Primary Examiner*—Patrick F. Brinson
*Attorney, Agent, or Firm*—Tobor & Goldstein, L.L.P.

[57] ABSTRACT

An improved tubular lining hose for use in softlining pipe rehabilitation which includes the novel use of a layer of reinforcing fibers to reinforce the lining hose. In a preferred embodiment, a layer of reinforcing fibers, such as fiberglass, is encapsulated between layers of resin absorbing material saturated with resin. The saturated resin absorbing layers form a protective veil around the reinforcing fibers and protect the reinforcing fibers from water and other corrosive materials.

11 Claims, 2 Drawing Sheets

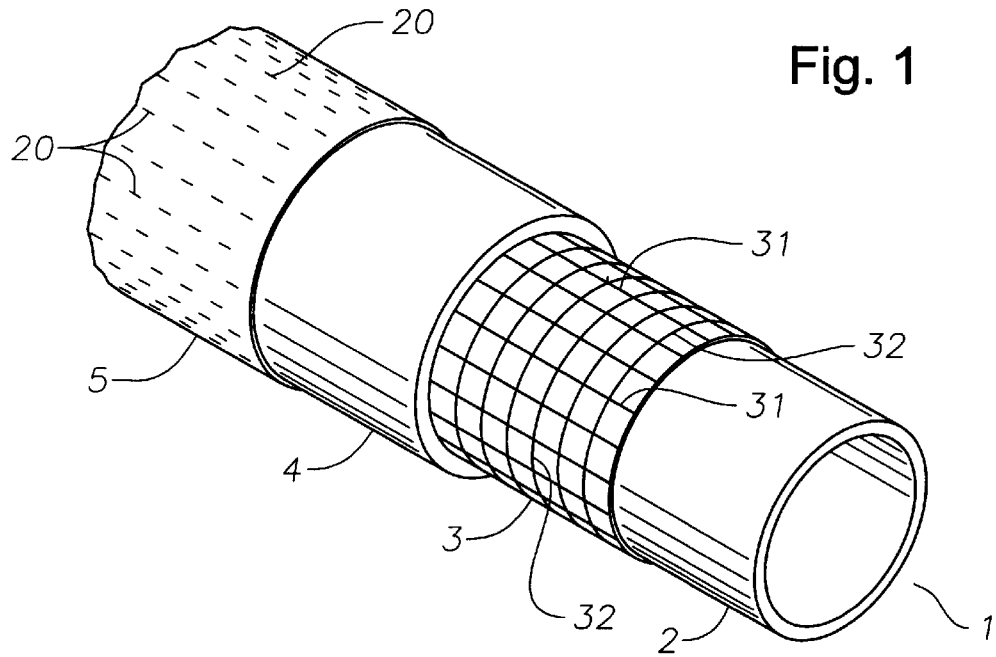
Fig. 1
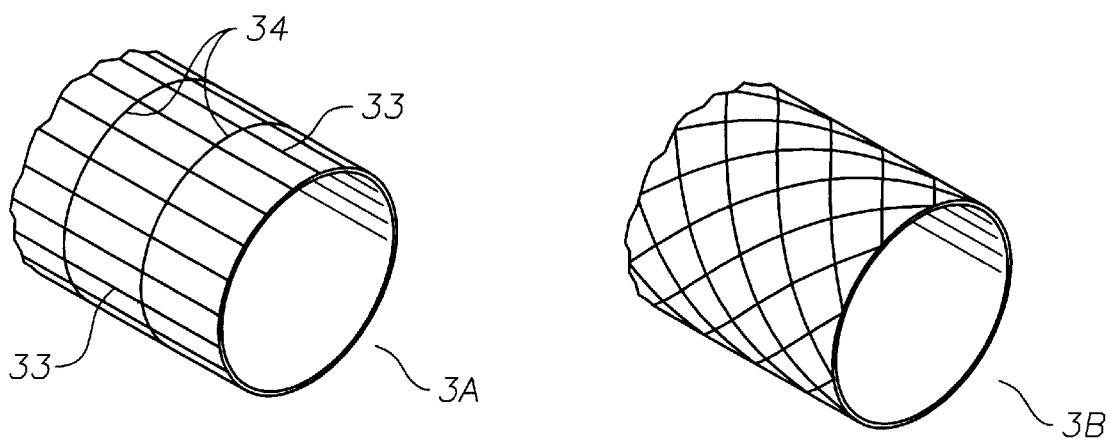
Fig. 2
Fig. 3
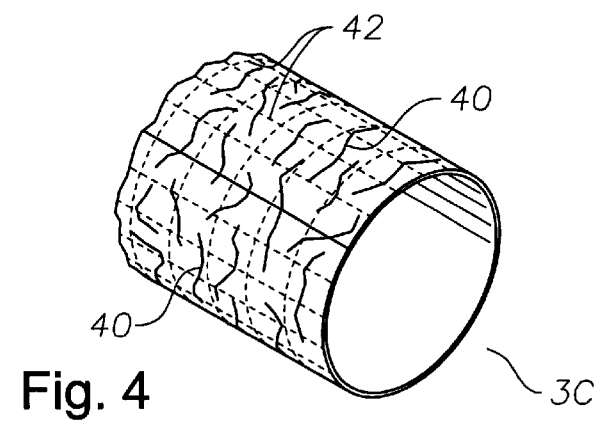
Fig. 4

REINFORCED LINING HOSE FOR SOFTLINING PIPE REHABILITATION

This application is a continuation of application Ser. No. 08/459,297, filed Jun. 2, 1995, now abandoned, which is a continuation of application Ser. No. 08/056,176, filed May 3, 1993, now abandoned.

BACKGROUND OF THE INVENTION

The present invention relates to an improved lining hose for use in methods of rehabilitating a pipe conduit which is in a damaged or deteriorated state. More particularly, the present invention relates to an improved lining hose for use in softlining pipe rehabilitation methods wherein the lining hose is saturated with curable resin, introduced into a pipe conduit and shaped to conformingly line the pipe conduit where it is cured in place so as to form a rigid liner.

Various methods of rehabilitating a pipe conduit which is buried underground are known in the art. Generally speaking, such methods include the use of a liner having a diameter which is substantially the same as the inner diameter of the pipe conduit to be rehabilitated. The liner frequently includes an impermeable layer and an adjacent resin-absorbing layer. This resin-absorbing layer is impregnated with a liquid resin prior to the introduction of the thus treated liner into the pipe conduit. After being properly positioned in the pipe conduit, the liner is pressed against the inner surface of the pipe conduit by fluid pressure.

One such method of lining a pipe is disclosed in U.S. Pat. No. 4,009,063 which discloses a liner comprising a non-woven felt sandwiched between an outer membrane and an inner membrane of plastic sheet material. The non-woven felt material is impregnated with an uncured thermosetting resin. The resin is cured while the liner is held against the inner surface of the pipe conduit so as to form a rigid self-supporting liner. The alleged purpose of this impermeable outer layer is to avoid the need for cleaning the pipe conduit prior to installation of the liner.

Another method of lining a conduit is disclosed in U.S. Pat. No. 4,064,211. This method utilizes a liner having a resin impregnated inner layer and an impermeable layer outwardly bonded to and surrounding the inner layer. This liner is introduced into the interior of the pipe conduit by turning over one end region of the liner and causing the turned over region to gradually advance into the interior of the pipe conduit using an inversion process. During this inversion process, the resin impregnated layer is gradually transferred to the exterior of the lining hose by fluid pressure. The resin impregnated layer will contact the inner surface of the pipe conduit. In order to eliminate friction, the liner, before being turned inside out, is supported buoyantly by liquid which serves to carry the liner.

U.S. Pat. No. 4,770,562 discloses a method for rehabilitating a conduit using a lining hose having an outer impermeable layer surrounding and adjacent to an inner resin-absorbent layer. The resin-absorbent layer is saturated with an excess volume of resin. The outer impermeable layer is then perforated to form a plurality of flowthrough openings for the resin. The lining hose is subsequently introduced in a collapsed state into the pipe conduit, and the lining hose is shaped to conformingly line the pipe conduit. The shaping of the lining hose is accomplished by everting an auxiliary hose, also known as a calibration hose, inside the lining hose. The eversion of the calibration hose inside the lining hose will force the excess amount of resin through the flowthrough openings and into contact with the inner surface of the pipe conduit. The excess resin will also fill existing cracks and fissures in the conduit. A variation of the liner described in the U.S. Pat. No. 4,770,562 includes a relatively thin layer of resin-absorbent material outwardly adjacent to the impermeable surface. This thin layer of resin-absorbent material facilitates the spreading of the excess resin once the impermeable layer has been perforated and the shaping of the lining hose process has begun.

As previously stated, most liners in softlining applications utilize a layer of nonwoven felt for the resin absorbing layer of the lining hose. One of the purposes of the felt is to provide support for the uncured resin of the impregnated lining hose. The felt serves as a reservoir and/or carrier means for the uncured resin. Once cured, the resin provides the structural strength of the liner. The layer of felt is actually a deterrent to the strength of the liner after the resin has cured since it occupies space that could otherwise be filled with resin.

In the past, practitioners in the softlining industry have also utilized a layer of fiberglass for the resin absorbent member of the lining hose. U.S. Pat. 4,770,562 teaches such a use. A fiberglass mat provides greater structural strength for both the uncured and cured liner than does a mat of nonwoven felt. Despite its superior strength characteristics, fiberglass has not replaced felt as the preferred medium for the resin absorbing layer due to the wicking problems associated with fiberglass.

Fiberglass fibers have a high resistance to stretching. The resin in a cured-in-place liner bonds or adheres to fiberglass fibers upon curing. Due to the bond between the resin and the fiberglass fibers, the resin also becomes more resistant to stretching when axial or radial loads are applied to the cured liner. Thus, the cured resin is reinforced by fiberglass so long as the bond between the resin and fiberglass is not broken.

Cured-in-place liners are typically installed in environments that are continuously exposed to water and other corrosive materials. Cured-in-place liners are also exposed to varying temperatures and flow conditions. The bond between the fiberglass and cured resin is subject to constant stress and strain due to the different coefficients of expansion of resin and fiberglass. Over time, the repeated expansion and contraction of the resin and fiberglass, caused by the varying temperature and flow conditions, will create tiny spaces between the resin and the fiberglass fibers.

With conventional cured-in-place liners using fiberglass, the fiberglass fibers located on the inner and outer surfaces of the liner are exposed to the water and other corrosive materials. Due to capillary or wicking action, the water and other corrosive materials are absorbed into the tiny spaces adjacent to the exposed fiberglass fibers. The absorption of water and other corrosive materials enhances the expansion and contraction of the resin and fiberglass, thereby further deteriorating the bond between the resin and fiberglass. Corrosive reactions with the resin/fiberglass laminant also exacerbates the deterioration of the bond between the resin and fiberglass. As a result of the wicking action, the space between the resin and fiberglass fibers becomes progressively larger and larger. In addition, as the space between the resin and a given fiber grows in size and length, previously unexposed fiberglass fibers adjacent to the exposed fibers become exposed to the water and other corrosive materials. Over time, the wicking of water and other corrosive materials into the laminant will destroy the bond between the resin and the fiberglass fibers. When this occurs, the reinforcing effects of the fiberglass is lost causing the liner to lose much of its structural strength, thereby ending the useful life of the liner prematurely.

Other reinforcing materials, such as Kevlar™ and carbon fibers, may be used as substitutes for nonwoven felt. However, these materials may also experience the problems associated with fiberglass when exposed to water and other corrosive materials.

The present invention overcomes the wicking problems associated with the use of fiberglass and other reinforcing fibers. The lining hose of a preferred embodiment of the present invention sandwiches a layer of fiberglass, or other desirable reinforcing fiber, between an inner and outer layer of resin absorbent material. The resin absorbent material, such as nonwoven felt, is saturated with curable resin. Upon curing, the resin in the inner and outer resin absorbent layers encapsulate the fiberglass layer and protects it from water and other corrosive materials. Thus, the resin absorbent material acts as a protective veil surrounding the layer of reinforcing fiber. Wicking problems are virtually eliminated because the reinforcing fibers are not exposed to water or other corrosive materials.

SUMMARY OF THE INVENTION

The present invention relates to an improved tubular lining hose for lining a pipe. More particularly, the improved tubular lining hose is used in softlining pipe rehabilitation. The lining hose includes the novel use of a layer of reinforcing fibers to reinforce the lining hose. In a preferred embodiment of the present invention, a layer of reinforcing fibers is positioned between an inner and outer layer of resin-absorbing material. The resin-absorbing material is saturated in curable resin prior to installation of the tubular liner. The resin from the inner and outer resin-absorbing layers encapsulates the layer of synthetic fibers, thereby protecting the layer of synthetic fibers from water and other corrosive materials.

The layer of fiberglass, or other desirable reinforcing fibers, adds increased strength characteristics to both the uncured and cured liner. As a result of the increased strength, longer sections of pipe may be lined. In addition, a cured liner of the present invention can be configured to withstand greater external and internal loads than conventional cured-in-place liners. As a result of its increased strength, the reinforced lining hose of the present invention requires less resin absorbent material and less resin to fully saturate the lining hose than conventional cured-in-place liners. Thus, the improved lining hose requires less materials to produce a stronger final product. In addition, the improved lining hose reduces the amount of curing time, and thus saves additional monies, due to the smaller volume of resin being cured.

Another feature of the present invention is that the orientation of the fiberglass or other reinforcing fibers may be arranged to meet the reinforcing requirements of a particular job.

In a preferred embodiment, a fiberglass mat is encapsulated between layers of nonwoven, polyester felt. Other embodiments of the present invention use a mat of Kevlar™ fibers, or a mat of carbon fibers, encapsulated between layers of nonwoven polyester felt. Other materials may be used for the layer of reinforcing fibers so long as the layer of reinforcing fibers has greater tensile and/or radial strength than the adjacent resin-absorbing material.

BRIEF DESCRIPTION OF THE DRAWINGS

The present invention will be described below in more detail with reference to the accompanying drawings in which:

FIG. 1 illustrates the construction of a preferred embodiment of the present invention;

FIG. 2 illustrates an alternative arrangement of the fibers of the reinforcing layer;

FIGS. 3 and 4 are similar to FIG. 2, illustrating other arrangements of the fibers of the reinforcing layer.

DETAILED DESCRIPTION OF THE PREFERRED EMBODIMENTS

Figure 5:
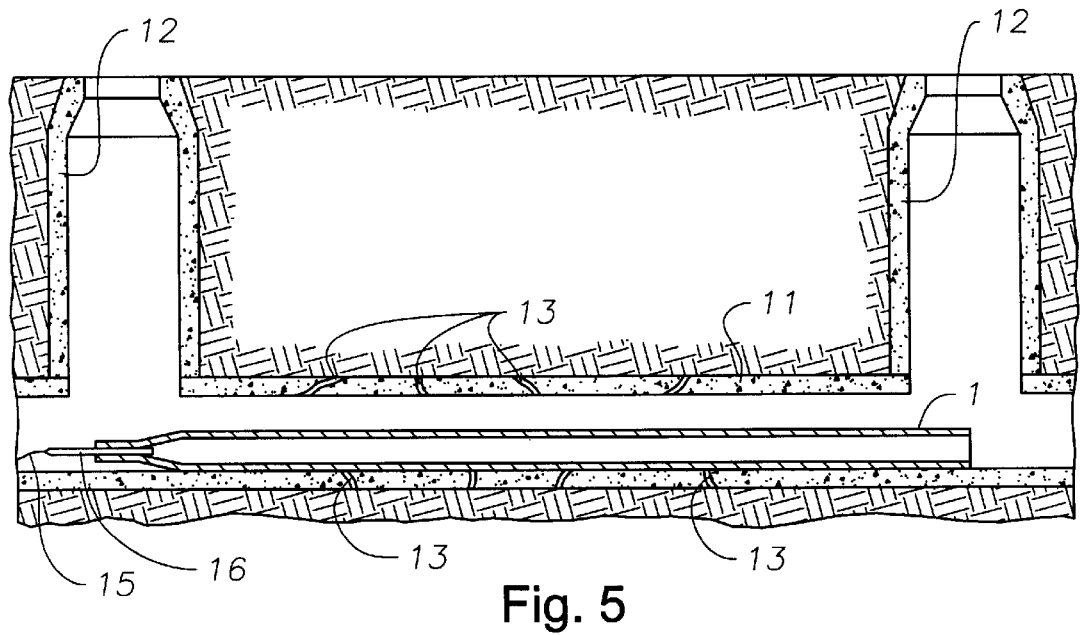
FIG. 5 is a longitudinal sectional view of a pipe conduit section located between two control shafts with a lining hose received therein in its collapsed state.

A preferred embodiment of the lining hose of the present invention is illustrated in FIG. 1. A lining hose 1 is shown having an inner layer of resin absorbing material 2. Outwardly adjacent to the inner layer 2 is a layer of reinforcing fibers 3. An outer layer of resin absorbing material 4 is outwardly adjacent to the layer of reinforcing fibers 3. Outer covering layer 5 is outwardly adjacent to the outer resin absorbing layer 4. The lining hose 1 may be made, for example, of an inner and outer layer of resin absorbent material consisting of a nonwoven fibrous material such as polyester needled felt. The layer of reinforcing fibers 3 may consist of a mesh or mat of fiberglass. The outer covering layer 5 generally is a synthetic plastic material such as polyurethane which is impermeable to fluid. The outer covering layer 5 is fixedly attached to the resin absorbent outer layer 4 by adhesion, extrusion or other appropriate methods known in the industry.

By way of example, lining hose 1 may have an inner layer of resin absorbing material 2 comprising a layer of nonwoven polyester felt of 2–8 mm in thickness. The layer of reinforcing fibers 3 may comprise a relatively thin, up to 2 mm thick, mesh of fiberglass fibers. The outer layer of resin absorbing material 4 may comprise a 2–8 mm thick layer of nonwoven polyester felt. Other embodiments may have layers of varying thickness. The thickness of the various layers will depend upon such factors as the size, length and depth of a given pipe to be lined. An impermeable film of plastic material would comprise the outer covering layer 5. Examples of the plastic material use for the impermeable outer covering layer 5 include polyurethane, polypropylene and polyethylene.

The outer felt layer may be attached to the fiberglass mesh and inner felt layer by lightly flame bonding the inside surface of the outer felt layer to the outside surface of the inner felt layer. The fiberglass mesh is sufficiently porous so that polyester fibers from the inner and outer layers of felt protrude through the fiberglass mesh. The light flame bonding process sufficiently fuses the polyester fibers of the inner and outer felt layers that protrude through the fiberglass mesh together so that the reinforcing fiberglass mesh is sandwiched between the felt layers. The light flame bonding process does not destroy the permeability of the inner and outer felt layers and the layer of reinforcing fibers. Thus, when saturated with resin, the inner and outer felt layers form a protective veil around the reinforcing fiberglass mesh such that the latter is protected from water and other corrosive materials.

Alternative methods of constructing the reinforced lining hose of the embodiment include stitching the layer of reinforcing fibers to the resin absorbent layers or using a combination of stitching and light flame bonding techniques to position the reinforcing fibers between the resin absorbing materials. Other techniques for constructing the reinforced lining hose will be apparent to those of skill in the art.

As shown in FIG. 1, reinforcing layer 3 is composed of reinforcing fibers oriented with a substantially equal number of fibers running longitudinally and radially to the axis of the hose. Longitudinal fibers 31 are generally parallel to the longitudinal axis of lining hose 1. Radial fibers 32 are generally radial to the longitudinal axis of lining hose 1. Such an embodiment generally provides both radial and longitudinal reinforcement to the lining hose. Such an orientation improves the strength of the lining hose for internal radial loads, external radial loads, and longitudinal loads while limiting stretch in all directions. Such an orientation would provide increased strength for: lining long sections of pipe having few, if any, service lines; lining deep pipes exposed to high internal and external loads; lining badly deteriorated pipes that have large sections of the pipe wall missing; and lining some pressure pipes.

FIGS. 2, 3 and 4 show alternative orientations of the reinforcing fibers of the reinforcing layer 3. FIG. 2 illustrates a layer of reinforcing fibers that are orientedpredominantly parallel to the longitudinal axis of the lining hose. The radial or latitudinal fibers 34 are included mainly for handling purposes of the mat or mesh. Such an arrangement of predominantly longitudinal fibers, shown as 33, will increase the longitudinal strength of the liner. Thus, this embodiment will allow longer sections of lining hose to be pulled within a pipe. Such an arrangement of predominantly longitudinal fibers will limit the longitudinal stretch of the lining hose to virtually zero while allowing radial stretching of the hose. The radial stretching permitted by this embodiment of the reinforcing layer 3A, will allow dimpling to occur at service connections for easy identification of the same.

FIG. 3 illustrates the reinforcing layer 3B whereby the reinforcing fibers are arranged in a cross-hatched manner diagonally about the longitudinal axis of the lining hose. Such an arrangement provides the most reinforcement for internal and external radial loads in the cured liner as compared with the embodiments shown in FIGS. 1 and 2. However, the diagonal arrangement depicted in FIG. 3 does not provide as much longitudinal reinforcement for use during pull-in and for limiting longitudinal stretch as do the embodiments shown in FIGS. 1 and 2. The cross-hatched embodiment shown in FIG. 3 also allows radial stretching of the lining hose.

FIG. 4 illustrates the reinforcing layer 3C whereby the reinforcing fibers are, in general, randomly oriented about the longitudinal axis of the lining hose. Reinforcing layer 3C includes layers of randomly oriented fibers 40 overlaying a cross-hatched stitching 42, designed to hold the randomly oriented fibers together as a mat. Cross-hatched stitching 42 may resemble the general pattern of layer 3 of FIG. 1 or layer 3B of FIG. 3 or any other desirable pattern that is effective to form a base for the overlying randomly oriented fibers. The mat of randomly oriented fibers are also referred to in the industry as a chopped strand mat. The layer of randomly oriented fibers 40 is generally denser than illustrated in FIG. 4. A chopped strand mat of reinforcing fibers will increase the radial strength of a cured liner. Accordingly, this embodiment is well suited for use in pressure pipes.

Other embodiments of the present invention may utilize a combination of the fiber orientations illustrated in FIGS. 1–4 so that a lining hose may be custom designed to meet the particular needs of any given job. For example, the embodiment illustrated in FIG. 2 may be combined with the embodiment shown in FIG. 1 so that the layer of reinforcing fibers 3A is located in the lining hose opposite service connections in the pipe to be lined. The remaining layer of reinforcing fibers would be oriented as shown in FIG. 1. This combination would allow easy identification of service connections to be reopened by a mechanical cutter while providing reinforcement for axial loads.

Other embodiments of the present invention may utilize Kevlar™ or carbon fibers for the layer of reinforcing fibers. Kevlar™ is the trademark for an aromatic polyamide fiber of extremely high tensile strength and greater resistance to elongation than steel. Other materials may be used for the layer of reinforcing fibers so long as the layer of reinforcing fibers 3 has greater tensile and/or radial strength than the inner and outer layers of resin absorbing material 2 and 4, respectively. In addition, the layer of reinforcing fibers may be comprised of a combination of different reinforcing fibers.

Figure 6:
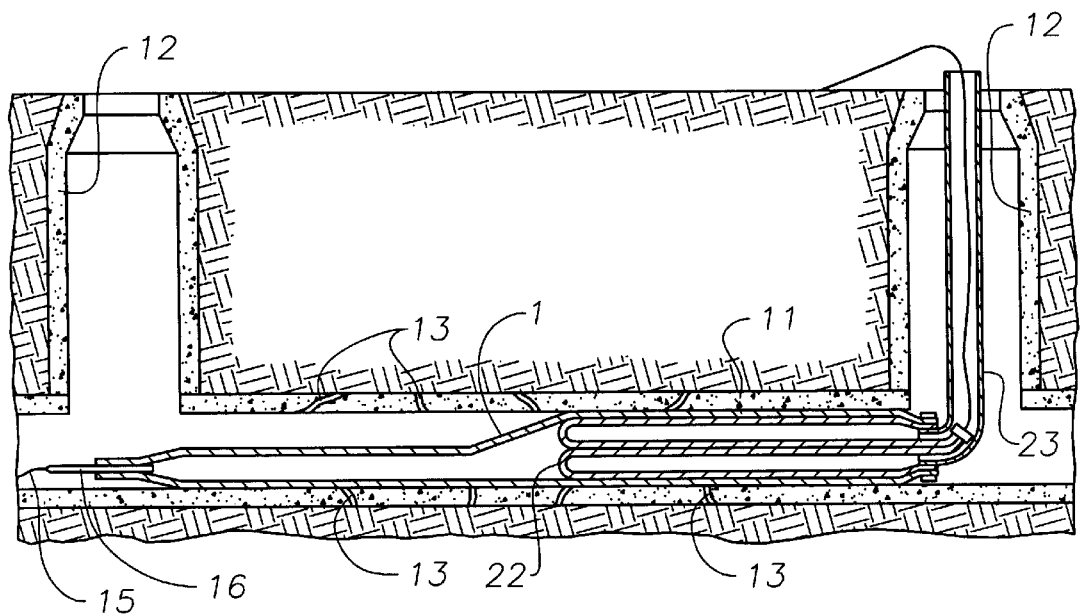
FIG. 6 is a view similar to FIG. 5, illustrating the inversion of a calibration hose into the lining hose.

Various methods for installing a lining hose are known in the art. One such method is illustrated in FIGS. 5 and 6. Referring to FIG. 5, pipe conduit 11 is buried underground and is provided with control shafts or manholes 12 which lead to the surface. In FIGS. 5 and 6 there is illustrated a section of the pipe conduit which is situated between the two control shafts. The pipe conduit generally is in a deteriorated shape and may include a plurality of cracks or fissures as illustrated by the numeral 13.

A lining hose 1 is shown to be already received in the interior of the section of the pipe conduit 11 which is situated between the two aforementioned control shafts 12 having been pulled into the illustrated position in its flattened or collapsed state by means of a rope or cable 15 and a non-illustrated winch. The rope or cable 15 is secured to one end of the lining hose 1 by pulling member 16 as illustrated in FIG. 5. The pulling of the lining hose into the pipe section is generally known in the art.

Prior to inserting the lining hose into the conduit to be lined, the resin absorbent material of lining hose 1 is soaked with a volume of resin that exceeds the volume required to totally saturate the inner and outer layers of resin absorbent material, layers 2 and 4 respectively. The inner and outer layers of resin absorbent material may be saturated with resin using vacuum impregnation or injection methods that are commonly known in the art. The lining hose 1 must be saturated with a sufficient volume of resin so that the layer of reinforcing fibers 3 as shown in FIG. 1, is encapsulated in resin during both the uncured and cured stages of installation.

The introduction of resin may be performed directly at the installation site or it may be accomplished at an appropriate off-site location. After the volume of resin has been introduced into the lining hose, the outer covering layer 5 is perforated so as to provide the outer covering layer with flowthrough openings 20 as illustrated in FIG. 1. The perforating of the lining hose may also be performed at the installation site or it may be performed off-site. Methods of perforating the lining hose are known in the art.

The resin soaked lining hose is flexible enough to be pulled into the conduit in a collapsed position. The lining hose will later be expanded to substantially the inner diameter of the conduit to be lined. Accordingly, the lining hose 1 is constructed to have substantially the same diameter as the inner diameter of the pipe conduit to be lined. Due to its flexible nature, the lining hose may be installed through the existing control shaft 12 with little or no excavation work.

The collapsed lining hose 1 of FIG. 5 is shaped to conformingly line pipe conduit by introducing a calibration hose 22 into the lining hose. One method of introducing a calibration hose 22 into the lining hose 1 situated in the above-mentioned section of the pipe conduit 11 is illustrated in FIG. 6 of the drawings. An inversion pipe 23, which has the configuration of a tubular elbow, is inserted into the proximal control shaft 12 as shown in FIG. 6. The length of the inversion pipe will vary in order to accommodate the height or depth of the control shaft 12. The forward most free end of the calibration hose 22 and the associated end of the lining hose 1 are attached to the horizontally extending portion of inversion pipe 23. Before attaching the calibration hose to the inversion pipe, the forward end is turned over outwardly. The turned over portion of the calibration hose and the associated end of the lining hose may be attached to the inversion pipe 23 by use of steel bands or other appropriate means. Construction of the calibration hose 22 is commonly known in the art.

Initially, only the connecting end of the calibration hose 22 is turned over outwardly. As a result of the introduction of fluid into the inversion pipe 23, and in dependence on the attendant pressure buildup, the calibration hose 22 is expanded by the fluid entering the same from the inversion pipe 23 and, at the same time, the region of turning over of the calibration hose 22 becomes gradually and progressively displaced away from the region of attachment of the lining hose 1 and calibration hose 22 to the inversion pipe 23. To maintain a constant fluid pressure, it is merely necessary to maintain the height of the fluid column contained in the inversion pipe 23 constant. As the fluid pressure everts the calibration hose, the lining hose 1 is expanded, shaped and pressed against the internal surface of the pipe conduit 11.

The fluid pressure exerted on the calibration hose forces the excess resin through the flowthrough openings 20 of the outer covering layer 5 of the lining hose. The excess resin which passes through the flowthrough openings 20 of the outer covering layer 5 of the lining hose will bond the lining hose 1 to the internal surface of the conduit 11. Any remaining excess resin will flow into the cracks or fissures 13 of the conduit.

After the lining hose 1 has been fully shaped and expanded to the internal diameter of the pipe conduit, the resin is cured. The curing process may be accelerated by heating the fluid used to evert the calibration hose. Methods of accelerating the cure of the resin by heating the fluid are known in the art. After curing, the lining hose 1 forms a rigid liner which is rigidly connected to the original pipe conduit 11. Examples of suitable resins include polyester, vinylester, epoxy and other curable resins.

The lining hose described above is installed in a pipe using the method generally described in U.S. Pat. No. 4,770,562. Other embodiments of a lining hose utilizing the present invention may be installed in a pipe by alternative methods known in the softlining industry. The lining hose may include an outer covering layer 5 that is not perforated. Alternatively, the lining hose may include a protective inner covering layer, such as a film of polyurethane, inwardly adjacent to the inner layer of resin absorbing material 2.

In another embodiment of the present invention, the lining hose may include an additional resin-absorbent material externally and outwardly adjacent to the outer covering layer 5. This third layer of resin-absorbent material provides a passageway for distributing the excess resin that is forced through the flowthrough openings 20 in outer covering layer 5. The third layer of resin-absorbent layer may be a thin layer of non-woven material, such as needled polyester felt, which will facilitate the uniform distribution of the excess resin which flows through the flowthrough openings 20 around the exterior of the lining hose. It is important in such an embodiment to saturate the lining hose with a volume of resin that exceeds the volume required to totally saturate the inner and outer layers of resin absorbing material, 2 and 4 respectively. This ensures that the reinforcing fibers are totally encapsulated in resin, thereby protecting the reinforcing fibers from water and other corrosive materials.

In addition to the embodiments described above, the reinforced lining hose of the present invention may have only one resin-absorbent layer adjacent the layer of reinforcing fibers. Such an embodiment would be used in environments where only one side of the liner is exposed to water and other corrosive materials. In such a situation, the resin absorbent layer is positioned between the layer of reinforcing fibers and the water and other corrosive materials so that the resin in the resin absorbent layer forms a protective shield around the reinforcing fibers. Therefore, the reinforcing fibers are not exposed to water and other corrosive materials. Thus, the resin-absorbent layer will be either inwardly or outwardly adjacent the layer of reinforcing fibers depending on the location of the anticipated water and other corrosive materials, i.e., whether the water and other corrosive materials will be contacting the inside or the outside of the liner.

It will be understood by those skilled in the art that certain variations and modifications can be made without departing from the spirit and scope of the invention as defined herein and in the appended claims.

What is claimed is:

1. A lining hose for use in softlining pipe rehabilitation, wherein said lining hose is saturated with curable resin, introduced into a pipe, shaped to conformingly line said pipe and cured-in-place to form a rigid liner, said lining hose comprising:

an inner layer of resin absorbing material;

an outer layer of resin absorbing material; and a layer of reinforcing fibers between and fixedly attached to said inner and outer layers of resin absorbing material, said layer of reinforcing fibers being encapsulated in resin, when said inner and outer layers of resin absorbing material are saturated with resin said layer of reinforcing fibers having a greater tensile or radial strength than at least one of either the inner layer or the outer layer of resin absorbing material.

2. The lining hose of claim 1 wherein said layer of reinforcing fibers comprises a layer of fiberglass.

3. The lining hose of claim 1 wherein said layer of reinforcing fibers comprises a layer of aromatic polyamide fibers.

4. The lining hose of claim 1 wherein said layer of reinforcing fibers comprises a layer of carbon fibers.

5. The lining hose of claim 1 wherein said lining hose includes an impermeable layer that outwardly adjoins said outer layer of resin absorbing material.

6. The lining hose of claim 1 wherein said lining hose includes a perforated plastic film that outwardly adjoins said outer layer of resin absorbing material.

7. The lining hose of claim 1 wherein said inner and outer resin absorbing material is nonwoven polyester felt.

8. A lining hose, for use in softlining pipe rehabilitation wherein said lining hose is saturated with curable resin, introduced into a pipe, shaped to conformingly line said pipe and cured-in-place to form a rigid liner, said lining hose comprising:

a layer of reinforcing fibers; and a layer of resin absorbing material fixedly attached and positioned adjacent to said layer of reinforcing fibers so that said layers of resin absorbing material, when saturated with resin, shields said layer of reinforcing fibers from water or other corrosive materials that contacts said liner;

wherein said layer of reinforcing fibers has a greater tensile or radial strength than said layer of resin absorbing material.

9. The lining hose of claim 1 wherein said layer of reinforcing fibers is fixedly attached to the inner or outer layers of resin absorbing material by flame bonding.

10. The lining hose of claim 8 wherein said layer of reinforcing fibers is fixedly attached to the layer of resin absorbing material by flame bonding.

11. The lining hose of claim 1 wherein said layer of reinforcing fibers comprises a chopped strand mat of reinforcing fibers.

* * * * *